(12) United States Patent
Thorburn

(10) Patent No.: US 8,718,086 B2
(45) Date of Patent: May 6, 2014

(54) METHOD FOR COMMUNICATION IN A HVDC POWER TRANSMISSION SYSTEM, CONTROLLER UNIT AND COMPUTER PROGRAM PRODUCT

(75) Inventor: Stefan Thorburn, Västerås (SE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/879,047

(22) PCT Filed: Oct. 15, 2010

(86) PCT No.: PCT/EP2010/065538
§ 371 (c)(1),
(2), (4) Date: Apr. 12, 2013

(87) PCT Pub. No.: WO2012/048752
PCT Pub. Date: Apr. 19, 2012

(65) Prior Publication Data
US 2013/0195116 A1 Aug. 1, 2013

(51) Int. Cl.
*H02J 3/36* (2006.01)
(52) U.S. Cl.
USPC .......................................................... 370/458

(58) Field of Classification Search
None
See application file for complete search history.

(56) References Cited

U.S. PATENT DOCUMENTS

| 4,106,085 A | 8/1978 | Demarest et al. |
| 4,672,519 A | 6/1987 | Liss |
| 2006/0079971 A1* | 4/2006 | Billo .............................. 700/90 |

FOREIGN PATENT DOCUMENTS

EP 0 868 004 A1 9/1998

* cited by examiner

*Primary Examiner* — Sulaiman Nooristany
(74) *Attorney, Agent, or Firm* — Birch, Stewart, Kolasch & Birch, LLP

(57) ABSTRACT

A method in a converter station for communication within a DC power transmission system including two or more interconnected converter stations includes receiving, in the converter station, a synchronization signal for synchronizing the two or more converter stations; obtaining, in the converter station, an allocation of a communication time slot; changing, in the converter station, a set-point DC voltage level during the communication time slot; and measuring, in the converter station, a change of DC current in timeslots other than the communication time slot. A communication method utilizing the DC power transmission system itself is thus provided.

19 Claims, 3 Drawing Sheets

METHOD FOR COMMUNICATION IN A HVDC POWER TRANSMISSION SYSTEM, CONTROLLER UNIT AND COMPUTER PROGRAM PRODUCT

FIELD OF THE INVENTION

The present invention relates generally to the field of HVDC power transmission systems, and in particular to communication in such systems.

BACKGROUND OF THE INVENTION

HVDC (High Voltage Direct Current) is a well-proven technology for transmitting electric power over long distances, and provides an alternative to the more conventional AC transmission. Most HVDC power transmission systems comprise point-to-point connections, but HVDC power transmission systems comprising multi-terminal connections, especially for voltage source based HVDC converters, are experiencing growing interest and are under intense development.

In the HVDC power transmission system it is most important to be able to establish communication between the terminals, i.e. between the converter stations. This is particularly true in the multi-terminal system as such systems entail somewhat more complex control schemes compared to point-to-point systems. In the multi-terminal system, aspects such as for example balancing of power orders between the different converter stations, managing of overload and relocating power between converter stations are more complex as a particular converter station may be interconnected to more than one other converter station.

The communication between the converter stations thus comprises for example exchange of control data such as power scheduling orders and power levels. The communication means conventionally comprises an external, separate data communication system and/or telecommunication network to which all converter stations are connected and by means of which the control data may be exchanged.

The HVDC power transmission system has to be able to operate even in case of failure of the data communication system and/or telecommunication network and is therefore designed for such cases. However, loss of the external communication means would lead to a situation in which the converter stations have to rely on backup schemes e.g. utilizing estimations, non-updated control data and/or control data based only on data available at the respective converter station. To operate the HVDC power transmission system based only on local information is obviously less than optimal and the exchange of control data between the converter stations is therefore much desired for obtaining optimal operation of the HVDC power transmission system.

In "A novel control technique to operate DC/DC converters in parallel with no control interconnections", by A. Tuladhar and H. Jin, a control method is described for load sharing. A small ac voltage is injected into the system and used as a control signal. However, such method would require costly equipment on the high voltage side for modulating a high frequency carrier signal onto the transmission line. Further, such method is not practical in a large DC grid with high line capacitance to ground which will require high injection power levels.

From the above it is clear that it would be desirable to be able to alleviate the need for and dependence on external communication means such as the separate data communication system and/or telecommunication system.

SUMMARY OF THE INVENTION

It is general object of the present invention to provide means and methods for enabling communication in the HVDC power transmission system, for overcoming or a least alleviating the above-mentioned drawbacks of the prior art.

This object, among others, is achieved by a method, controller and computer program product as claimed in the independent claims.

In accordance with an embodiment of the invention, a method in a converter station is provided for communication within a DC power transmission system comprising two or more interconnected converter stations. The method comprises the steps of: receiving, in the converter station, a synchronization signal for synchronizing the two or more converter stations; obtaining, in the converter station, an allocation of a communication time slot; changing, in the converter station, a set-point DC voltage level during the communication time slot; and measuring, in the converter station, a change of DC current in timeslots other than the communication time slot. By changing the set-point DC voltage level in communication time slots, and measuring the corresponding change in current, when the converter stations are synchronized, information can be conveyed between the converter stations without the use of an external communication system. Further, by means of the invention, the need of and dependence on an external communication network for exchanging relevant information between the converter stations of the HVDC power transmission system is eliminated. Instead, information can be exchanged by means of an internal communication method, which improves the reliability of e.g. control information exchange in a HVDC power transmission system. The communication method can easily be implemented in existing DC power transmission systems. Further yet, the costs related to implementing the method are kept at a minimum.

In accordance with another embodiment of the invention, the synchronizing comprises utilizing the Global Positioning System for transmitting to the converter stations a time reference, or arranging a master converter station to transmit a synchronization signal to the converter stations.

By utilizing an existing and accurate synchronization means, such as the Global Positioning System, small investment costs are required, while still obtaining sufficient accuracy.

In accordance with another embodiment of the invention, a change measured at a converter station in the step of measuring, is used for deriving a distance to the converter station having made the change in it set-point DC voltage level.

In accordance with another embodiment of the invention, the method comprises the step of modulating, during the designated communication time slot, the set-point DC voltage level, whereby a modulated signal comprising digital control information is exchanged between the two or more converter stations.

In the above embodiment, the digital control information may comprise a deviation from desired voltage level and the method may then comprise the further step of, in a converter station receiving the control information, adjusting the set-point DC voltage level in order to meet the deviation of the converter station transmitting the control information. An efficient load sharing between converter stations can thus be rapidly obtained, without the use of an external communication network.

In accordance with a further feature of the above embodiment, a duration of the modulated signal gives information about the urgency to adjust the set-point DC voltage level and/or an actual or desired magnitude of a voltage level.

In accordance with another embodiment of the invention, the method comprises the further step of: measuring in at least one point of the DC power transmission system a current change as a result of the step of changing a set-point DC voltage level. By means of this feature, an improved way of state estimation of the DC power transmission system is provided. In particular, as real-time measurements in the DC power transmission system is enabled by means of the invention, rapid re-dispatches can be made and for example cascaded contingencies and overload situations can be avoided.

In the above embodiment, two points are used and they may comprise a respective end of a transmission line of the DC power transmission system. Differential protection is facilitated if using two such points.

In accordance with another embodiment of the invention, the method comprises further step of: correlating the measured current change to a converter station having most influence on said current change. By means of this feature, the risk of e.g. a transmission line becoming overloaded is highly reduced.

In accordance with another embodiment of the invention, the information communicated comprises one or more of: deviation from desired voltage level, frequency of a respective ac-network, signals common to all of said converter stations such as pilot node voltage, load level within said DC power transmission network or load level within the respective converter stations. Various information relevant for the operation of the power transmission system may thus be exchanged between the converter stations.

The invention also encompasses computer program products and controller units, whereby advantages corresponding to the above are achieved.

Further features and advantages thereof will become clear upon reading the following description and the accompanying drawings.

DETAILED DESCRIPTION OF EMBODIMENTS OF THE INVENTION

The present invention is advantageously implemented in a DC power transmission system, preferably Voltage Source Converter HVDC system, which in the following description is denoted HVDC grid, and the invention is described with reference to such HVDC grid.

Figure 1:
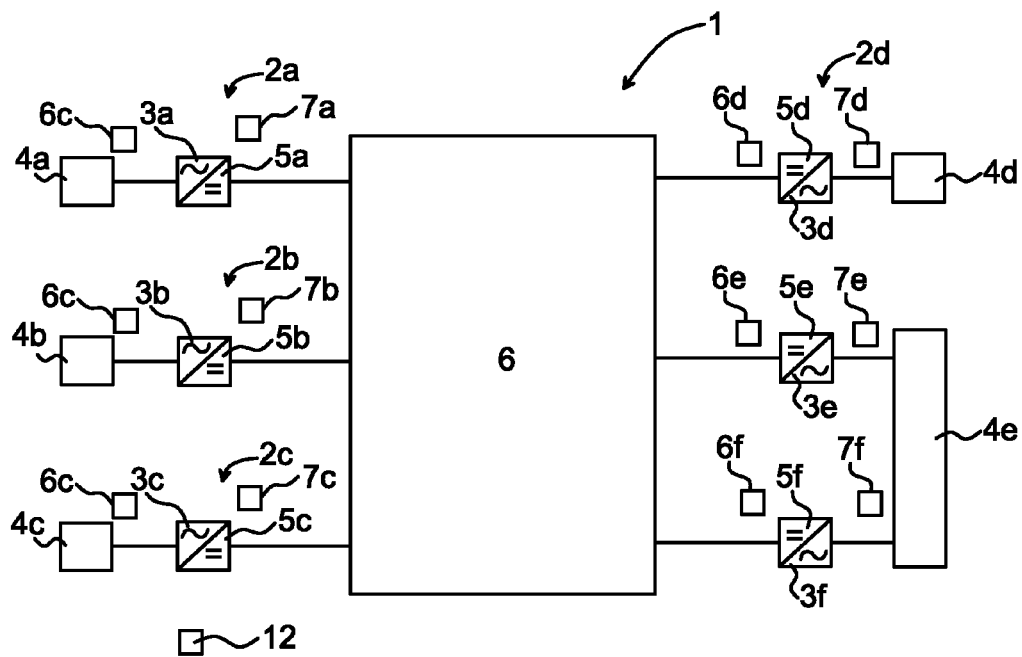
FIG. 1 illustrates schematically a HVDC grid in which the present invention may be implemented.

FIG. 1 illustrates schematically a HVDC grid 1 comprising six converter stations 2a, 2b, 2c, 2d, 2e, 2f interconnected in any configuration, e.g. a star network or having any polygon configuration. It is realized that any number of converter stations may be included in the HVDC grid 1. The converter stations 2a, 2b, 2c, 2d, 2e, 2f comprise inverters converting DC to AC and/or rectifiers converting AC to DC. Other components and means conventionally used within a HVDC grid for enabling DC power transmission, but not forming part of the invention, may also be included but are omitted from the description and figures in order of simplicity.

The converter stations 2a, 2b, 2c, 2d, 2e, 2f are preferably voltage source based converters and comprise an AC side 3a, 3b, 3c, 3d, 3e, 3f connectable to an AC network 4a, 4b, 4c, 4d, 4e. It is noted that there could be another number of AC networks. The converter stations 2a, 2b, 2c, 2d, 2e, 2f further comprise a DC side 5a, 5b, 5c, 5d, 5e, 5f connectable to a DC transmission network 6 for power transmission. The converter stations 2a, 2b, 2c, 2d, 2e, 2f may, as mentioned, be interconnected in any suitable manner.

The converter stations 2a, 2b, 2c, 2d, 2e, 2f may be interconnected by means of power transmission lines, also denoted cable lines, or by overhead lines in a known manner. Such power transmission lines allow the power transmission and are not explicitly illustrated in the FIG. 1.

Each converter station 2a, 2b, 2c, 2d, 2e, 2f comprises a local controller unit, illustrated at reference numerals 6a, 6b, 6c, 6d, 6e, 6f for the respective converter stations. The control unit enables, among other things, power and/or voltage regulation in the converter station. The local controller unit may for example be a general purpose computer comprising appropriate software instructions enabling the desired control functions.

In accordance with the invention, the HVDC grid 1 itself is used for communication. That is, the use of an external communication system (not illustrated in the drawings) may be omitted entirely or such external communication system may be used as an additional communication means but not exclusively relied upon for communication.

In accordance with the invention, all converter stations 2a, 2b, 2c, 2d, 2e, 2f are synchronized by an external clock, for example by utilizing the Global Positioning System (GPS) transmitting time information to all converter stations. The reference numerals 7a, 7b, 7c, 7d, 7e, 7f. In an alternative embodiment, a master converter station is arranged to synchronize all converter stations. The master converter station may, for example, transmit a synchronization signal in the form of a double-pulse or other signal in order to synchronize the converter stations. It is realized that yet other alternative ways of synchronizing a number of converter stations may be chosen.

In accordance with the invention, each converter station 2a, 2b, 2c, 2d, 2e, 2f is further designated with its own timeslot. That is, the time domain is divided into several recurring timeslots of fixed length, one for each converter station. For example, in the illustrated exemplifying HVDC grid 1 comprising six converter stations 2a, 2b, 2c, 2d, 2e, 2f each converter station may be assigned a 10 s time slot per minute, the time slots denoted TS00, TS10, TS20, TS30, TS40, and TS50, respectively. The time slot can thus be considered a communication channel, in a time division multiplexing manner.

A small set-point change, for example 0.1% or less is made in a converter station on the DC voltage level control in its timeslot. The voltage change made in the controller unit in one converter station is measured by the other converter stations as the controller units of the other converter stations are aware of that another converter station is modulating the signal. In particular, as the controller unit of a converter station is aware of that the signal is modulated, it may order a measurement of the corresponding change in current while the voltage change occurs.

It is noted that converter stations very far apart may not "hear" each other due to noise in the control while converter station located close to each other will have a clear and distinct signal.

Digital information can now be modulated onto this time slot, which could be considered an internal communication channel. For example, information about voltage level orders may be exchanged, one converter station indicating the need to raise the voltage or the need to lower the voltage, and another converter station indicating having no need to alter its voltage level. Converter stations that are located close can then respond to the need of its neighbors by making small adjustments in their set-points.

Further examples on control information (or control data) that can be exchanged between the converter stations comprise for example deviation from desired AC or DC voltage level, the frequency of the respective ac-networks and signals common to all converter stations, e.g. pilot node voltage or load level within the HVDC grid 1 or load level of particular converter stations.

Figure 2:
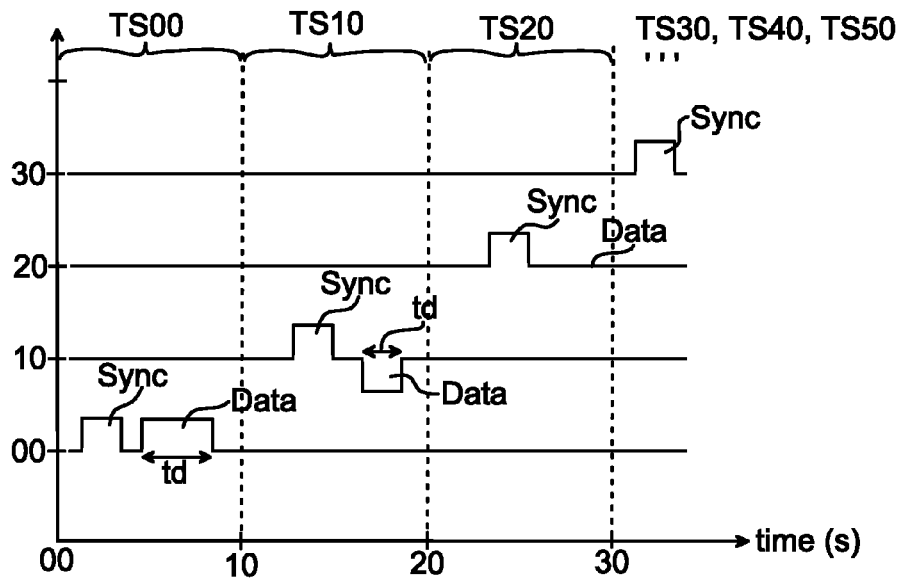
FIG. 2 illustrates an exemplary communication exchange between the converter stations

FIG. 2 illustrates an exemplary communication exchange between the converter stations. Assuming the earlier mentioned example, wherein each converter station is assigned a 10 s time slot per minute, converter station 2a is denoted 00-station, converter station 2b is denoted 10-station, converter station 2c is denoted 20-station, converter station 2d is denoted 30-station, converter station 2e is denoted 40-station and converter station 2f is denoted 50-station, the denomination thus referring to the starting point of the respective time slot or communication channel.

With reference to FIG. 2, the timeslot TS00 of the 00-station (i.e. converter station 2a) comprises a synchronization signal followed by the desired control data.

The next timeslot, i.e. timeslot TS10 of the 10-station (i.e. converter station 2b) comprises a synchronization signal followed by control data. Timeslot TS20 of the 20-station likewise comprises a synchronization signal and control data, and so on. In the exemplifying control data illustrated in FIG. 2, the control data of the 00-station exemplifies the need of the 00-station to raise its voltage level, the control data of the 10-station exemplifies the need of the 10-station to lower its voltage level and the control data of the 20-station exemplifies the 20-station being on a suitable voltage level.

It is noted that the above 10 s timeslot is used in order to illustrate the invention. The length of the timeslot could be adapted suitably in dependence on need and requirements within the system.

In an embodiment of the invention, the duration $t_d$ of the modulated signal is a measure of the actual value itself. This can be achieved in any suitable manner, for example by letting the total duration of the timeslot correspond to the voltage interval between minimum voltage and maximum voltage.

Further, in an embodiment, the duration $t_d$ of the modulated signal gives information about the urgency to increase or reduce the voltage level, and/or an actual or desired magnitude of a voltage level. In the FIG. 2, the duration $t_{d,00}$ of the modulated signal (i.e. control data duration) in timeslot 00 is longer than the duration $t_{d,10}$ of the modulated signal in timeslot 10. The need of converter station 2a to increase its voltage level is then more urgent than the need of converter station 2b to lower its voltage level.

Figure 3:
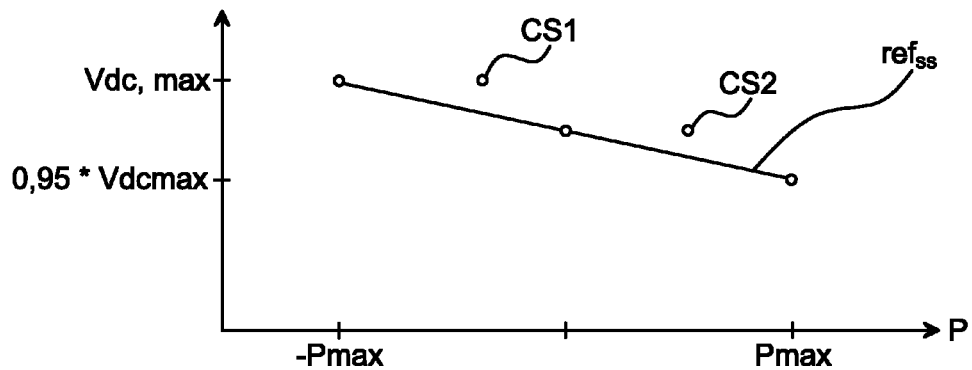
FIG. 3 illustrates a steady state reference.

The raising or lowering of a voltage level can be set in relation to a steady state reference, such that an inverter on a maximum rating would like to have maximum allowed DC voltage level and a rectifier at maximum output would like to have a "lower" voltage level typically 5% lower. FIG. 3 illustrates this: a steady state reference ref, is introduced. Two converter stations CS1 and CS2 are above the desired line, i.e. above the steady state reference $ref_{ss}$, for instance caused by primary control. That is, the working points being above the steady state reference $ref_{ss}$ may have been caused by the primary control. In such a situation, the converter stations are exposed to the risk of reaching maximum DC voltage level in case of a further contingency. If both converter stations slowly adjust their set-points slightly downwards it can be ensured that all converter stations are in good operating position.

In order to implement the invention, the converter station need to be provided with means for synchronizing itself in time and means to detect, transmit and interpret the control information modulated in the time slots, i.e. means for modulating and demodulating. The means for synchronization may comprise a receiver of a GPS signal, as mentioned earlier. The means for detecting and interpreting may comprise software and a suitable processor arranged to execute software code portions of the software, the software code portions implementing detection and interpretation steps. The controller unit may be adapted to perform the above steps.

It is noted that the modulation of DC voltage level that is done in accordance with the invention, need not imply changes on the AC sides 3a, 3b, 3c, 3d, 3e. Theoretically, when a pulse width modulation (PWM) conversion is modulated as a "voltage source behind a reactance", there is a possibility to change modulation index, PWM-angle, higher harmonic modulation and DC voltage set-point simultaneously and get constant real power P and reactive power Q injection into the AC grid. A description of the addition of a third harmonic to the PWM pattern for adjusting the fundamental AC voltage can, for example, be found in "Improvement of Pulse Width Modulation Techniques", by G. Buja and G. Indri, Padova, Archiv für Elektrotechnik 57 (1975) p 281-289.

There are numerous examples on situations in which the above-described method is applicable and wherein it may be used for improving the control of the DC grid. In the following the above communication method is illustrated with reference to a particular example. It is however realized that the inventive communication method is most usable in other situations as well.

A DC grid using a droop control strategy as primary control means for handling sudden changes in the DC grid requires a way of restoring the voltage levels to desired ones after the droop regulation having halted the change. This restoration of the working point is often referred to as secondary control. It is noted that the present invention, providing a communication method, is particularly suitable for handling such secondary control issues. AC grids with droop regulation of frequency control may utilize the fact that the frequency is a globally available and synchronous, which is used in order to reschedule the power production. In contrast, in the DC grid, in particular a large DC grid wherein the resistance cannot be neglected, there is no such common signal available as only the local voltage can be measured at each converter station. Instead, the control in the DC grid relies on for example the introduction of dead-band and pilot node regulation and external communication.

The present invention provides an improved way of restoring the working points in the above-described situation compared to the prior art solutions also described above. In particular, the converter stations 2a, 2b, 2c, 2d, 2e, 2f may exchange voltage level information and adjust their set-points accordingly by using the inventive communication method.

Figure 4:
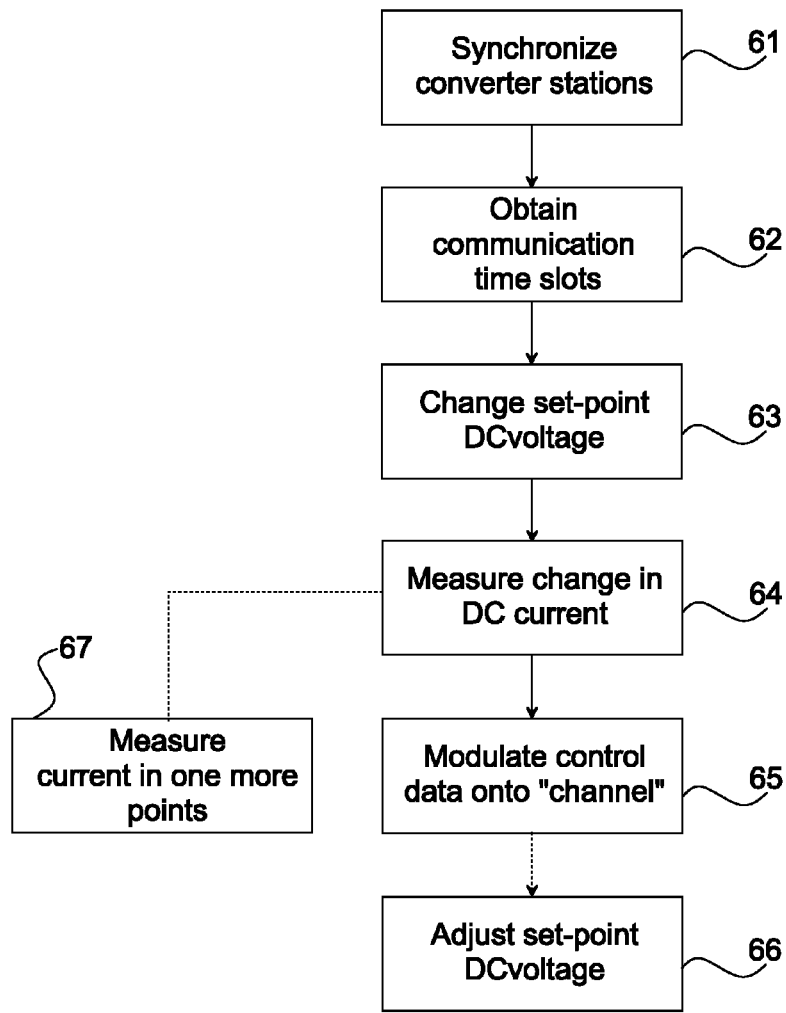
FIG. 4 illustrates a flow chart over steps in accordance with an embodiment of the present invention.

FIG. 4 illustrates a flow chart over steps in accordance with the present invention. The method 60 for communication within a DC grid 1 may be implemented in a converter station 2a, 2b, 2c, 2d, 2e, 2f, e.g. in the control unit thereof. The DC grid 1 comprises two or more interconnected converter stations 2a, 2b, 2c, 2d, 2e, 2f, which may e.g. be interconnected by means of transmission lines.

The method 60 comprises the first step of receiving 61, in the converter station 2a, 2b, 2c, 2d, 2e, 2f, a synchronization signal. The synchronization signal is used for synchronizing the two or more converter stations 2a, 2b, 2c, 2d, 2e, 2f. As mentioned earlier, this synchronization may be performed in any suitable manner, for example by utilizing a GPS signal.

The method 60 comprises the second step of obtaining 62, in the converter station 2a, 2b, 2c, 2d, 2e, 2f, an allocation of a communication time slot TS00, TS10, TS20, TS30, TS40, TS50, in which to transmit information. The allocation of communication time slots may be performed in any suitable manner. The converter station 2a, 2b, 2c, 2d, 2e, 2f may be arranged in a certain predetermined order, wherein a converter station is denoted a first converter station having a first communication time slot in a time divided manner, a second converter station having a second communication time slot in the time divided channel, and so on. The number of recurring communication time slots is, as mentioned earlier, adapted to the particular DC grid in question, e.g. depending on the number of converter stations. Once the converter station has received the synchronization signal, it may thus obtain a designated communication time slot, then being aware of in which communication time slot to transmit information.

The method 60 comprises the third step of changing 63, in the converter station 2a, 2b, 2c, 2d, 2e, 2f, a set-point DC voltage level during the communication time slot TS00, TS10, TS20, TS30, TS40, TS50. Each converter station 2a, 2b, 2c, 2d, 2e, 2f, may change a set-point DC voltage level during its respective designated communication time slot TS00, TS10, TS20, TS30, TS40, TS50, it is however noted that not all converter stations need to change its set-point DC voltage level. For example, if a converter station is operating at an optimal level, and thus having no need to e.g. adjust its DC voltage level, no change need to be indicated in its time slot.

The method comprises the fourth step of measuring 64, in the converter station 2a, 2b, 2c, 2d, 2e, 2f, a change of DC current in timeslots other than the communication time slot TS00, TS10, TS20, TS30, TS40, TS50.

Each converter station 2a, 2b, 2c, 2d, 2e, 2f measures a change in DC current, as a result of a changed set-point DC voltage level, in timeslots other than its own designated communication time slot. That is, a converter station is made aware of when to expect a data communication and measures the DC current change. The DC current change is then interpreted and for example set-point adjustments may be made in order to the need of the transmitting converter station.

By changing and measuring the set-point DC voltage level in designated communication time slots, when the converter stations are synchronized, information can be conveyed between the converter stations without the use of an external communication system.

In an embodiment, a DC current change measured at a converter station in the step of measuring 64, is used for deriving a distance to the converter station having made the change in it set-point DC voltage level.

The method 60 comprises the further step of modulating 65, during the designated communication time slot TS00, TS10, TS20, TS30, TS40, TS50, the set-point DC voltage level, whereby a modulated signal comprising digital control information is exchanged between the two or more converter stations 2a, 2b, 2c, 2d, 2e, 2f.

The digital control information may comprise a deviation from desired voltage level and the method 60 may comprise the further step of, in a converter station receiving the control information, adjusting 66 the set-point DC voltage level in order to meet the deviation of the converter station transmitting the control information. Further yet, a duration $t_d$ of the modulated signal gives, in an embodiment, information about the urgency to adjust the set-point DC voltage level. Further yet, the duration $t_d$ can also be a measure of the actual value itself or be proportional to the actual value. The duration $t_d$ can also be a measure of or proportional to a desired magnitude of a signal.

In the method 60, the information that is communicated between the converter stations may comprises one or more of: deviation from desired voltage level, frequency of a respective ac-network, a signals common to all of said converter stations such as pilot node voltage or load level within the HVDC grid 1 or load level within the respective converter stations.

In the following, another situation is illustrated in which the present communication method is applicable.

Figure 5:
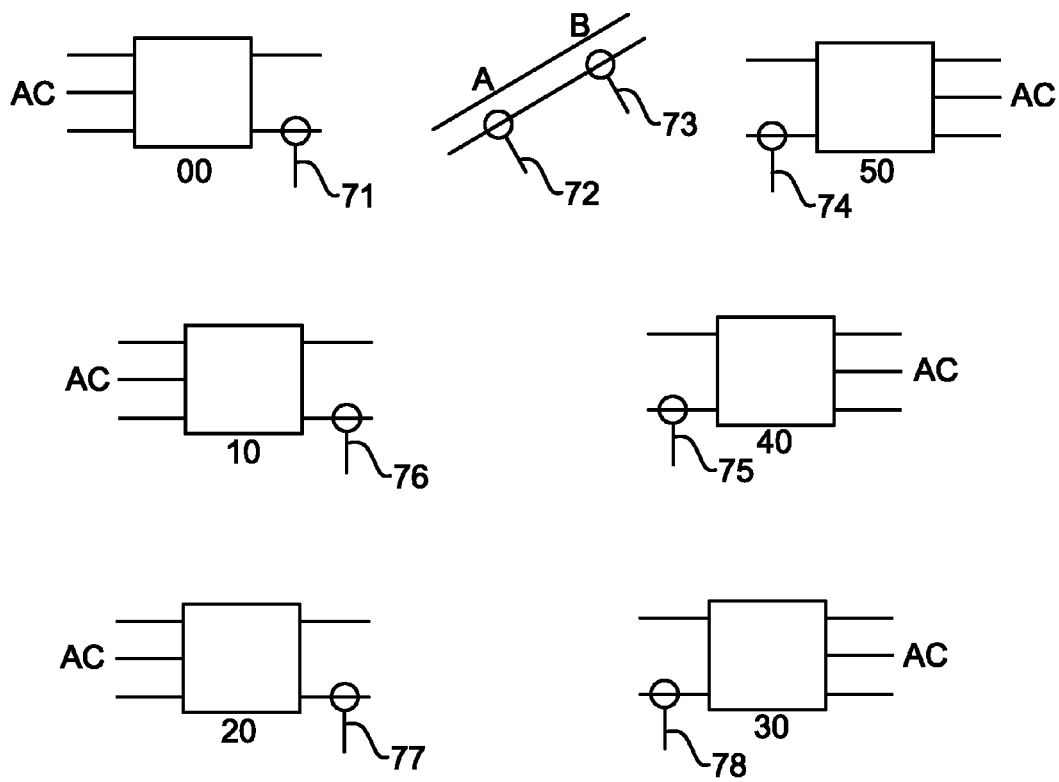
FIG. 5 illustrates in another schematic illustration the HVDC grid of FIG. 1.

FIG. 5 illustrates schematically the multi-terminal HVDC grid 1 of FIG. 1. Two transmission lines, lines AB and CD, are schematically illustrated without being shown as interconnected in any particular way. The converter station 00 (corresponding to converter station 2a), converter station 10 (corresponding to converter station 2b) etc. are also illustrated. In this embodiment, the converter stations inject a disturbance that is measurable by different current sensors, indicated at reference numerals 71-78 in the figure. Converter station 00 makes a small set-point change on the DC voltage level control on its timeslot. This change results in current change all over the HVDC grid 1. The change through each transmission line can be measured and correlated to a converter station that has most influence on the current flow. The measurements may be performed for example by conventional existing current transformers. By using the communication method, the power in a converter station having the most impact of the power flow through the particular line can then be limited rapidly, and in particular without the need of an external SCADA (supervisory control and data acquisition) system managing the HVDC grid set-points.

Figure 6:
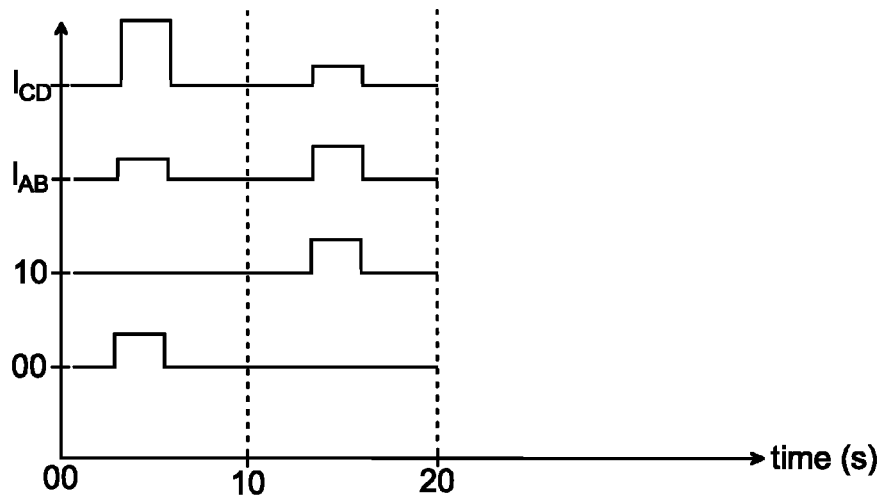
FIG. 6 illustrates correlation between converter stations used in accordance with an embodiment of the present invention.

FIG. 6 illustrates an example of the above, in particular, the figure illustrates the correlation between converter stations. Converter station 00 injects a disturbance, i.e. the small set-point on the DC voltage level control in its time slot TS00. A current $I_{AB}$ in a transmission line AB (reference to FIG. 5) is measured, and likewise, a current $I_{CD}$ in a transmission line CD (reference again to FIG. 5) is measured. In time slot TS10, the converter station 10 injects a small disturbance, and the current change caused by the voltage change is measured. By following the impact on current in the HVDC grid due to the DC voltage change it is possible to correlate which converter station that has the most impact on the line current. In the illustrated example, it can be determined that there is a strong coupling between the disturbance injected by converter station 00 and the transmission line CD, and a strong coupling between the disturbance injected by converter station 10 and the transmission line AB. If it is determined that the power of converter station 00, having the most impact of the power flow through transmission line CD, need to be limited, this can rapidly be done.

By means of this embodiment, it is possible to make actual real-time measurements in the HVDC grid 1 and rapidly take appropriate action. The invention makes it possible to directly derive the state of the HVDC grid 1 by the measurements. In contrast, the prior art way of performing for example a state estimation entails collecting data from all converter stations and processing the data at a central place. The present invention thus enables direct state measurement and thereby eliminates the need of an external state estimation, which can for example rapidly prevent overload situations.

It is noted that if an external communication system is used and fails, existing line protection will eventually trip an overloaded transmission line in due time, as would be the case without this feature. A tertiary (manual) supervision would in most cases avoid a tripping of the transmission line due to overload. However, in an embodiment of the invention, a function integrated in a secondary control is implemented.

Referring again to FIG. 4 and the above aspect of the invention, the method 60 may comprise the further step of measuring 67 in at least one point AB, CD of the HVDC grid 1 a current change as a result of the step of changing a set-point DC voltage level. If the measurement is done in two points they may comprise a respective end of a transmission line of the HVDC grid 1. If measuring in both ends of a transmission line, differential protection is facilitated.

The method 60 may further comprise the step of correlating the measured current change to a converter station having most influence on the current change, as was described with reference to FIG. 6.

The invention can also be provided as a computer program product 12 comprising computer readable means carrying the computer programs code, such as a memory like a CD ROM disc or a memory stick carrying the above mentioned program code. The program code of the computer program product performs the functionality of the invention when the carrier is being loaded into a computer. The functionality can also be provided in a server and downloaded from there to a computer functioning as the controller unit.

In particular, the computer program product 12 is provided for enabling communication within a DC power transmission system 1 comprising two or more interconnected converter stations 2a, 2b, 2c, 2d, 2e, 2f. The computer program product comprises computer readable means carrying computer programs code and the program code is configured to:
   handle a received synchronization signal for synchronizing the two or more converter stations 2a, 2b, 2c, 2d, 2e, 2f,
   obtain an allocation of a designated communication time slot TS00, TS10, TS20, TS30, TS40, TS50,
   change a set-point DC voltage level during the designated communication time slot TS00, TS10, TS20, TS30, TS40, TS50, and
   measure a change of DC current in timeslots other than the designated communication time slot TS00, TS10, TS20, TS30, TS40, TS50.

The invention also encompasses a controller unit 6a, 6b, 6c, 6d, 6e, 6f for a converter station 2a, 2b, 2c, 2d, 2e, 2f for enabling the communication method in the DC grid 1. The controller unit 6a, 6b, 6c, 6d, 6e, 6f then comprises means, for example the computer program product 12, for carrying out the method as described.

The invention claimed is:

1. A method in a converter station for communication within a DC power transmission system comprising two or more interconnected converter stations where the time domain is divided into several recurring time slots of fixed length, one for each converter station and each converter station is designated with its own communication time slot, said method comprising the steps of:
   receiving, in said converter station, a synchronization signal for synchronizing said two or more converter stations,
   obtaining, in said converter station, an allocation of a designated communication time slot,
   changing, in said converter station, a set-point DC voltage level during said designated communication time slot,
   measuring, in said converter station, a change of DC current, as a result of a changed set-point DC voltage level, in timeslots other than said designated communication time slot, and
   correlating said measured current change to said converter station having most influence on said current change,
   where the changing of a set point and measuring the change of DC voltage level in designated communication time slots, when the converter stations are synchronized, are performed for conveying information between the converter stations without the use of an external communication system.

2. The method as claimed in claim 1, wherein said step of receiving a synchronizing signal comprises utilization of the Global Positioning System, or arranging a master converter station to transmit a synchronization signal to said converter station.

3. The method as claimed in claim 2, wherein a change in current measured at said converter station in said step of measuring, is used for deriving a distance to a converter station having made the change in its set-point DC voltage level.

4. The method as claimed in claim 2, comprising the further step of:
   modulating, during said designated communication time slot, the set-point DC voltage level, whereby a modulated signal comprising digital control information is exchanged between said two or more converter stations.

5. The method as claimed in claim 2, comprising the further step of:
   measuring in at least one point of said DC power transmission system a current change as a result of said step of changing a set-point DC voltage level.

6. The method as claimed in claim 2, wherein information communicated comprises one or more of: deviation from desired DC or AC voltage level, frequency of a respective ac-network, a signals common to all of said converter stations such as pilot node voltage, load level within said DC power transmission network or load level within the respective converter stations.

7. The method as claimed in claim 1, wherein a change in current measured at said converter station in said step of measuring, is used for deriving a distance to a converter station having made the change in its set-point DC voltage level.

8. The method as claimed in claim 7, comprising the further step of:
   modulating, during said designated communication time slot, the set-point DC voltage level, whereby a modulated signal comprising digital control information is exchanged between said two or more converter stations.

9. The method as claimed in claim 7, wherein information communicated comprises one or more of: deviation from desired DC or AC voltage level, frequency of a respective ac-network, a signals common to all of said converter stations such as pilot node voltage, load level within said DC power transmission network or load level within the respective converter stations.

10. The method as claimed in claim 1, comprising the further step of:
   modulating, during said designated communication time slot, the set-point DC voltage level, whereby a modulated signal comprising digital control information is exchanged between said two or more converter stations.

11. The method as claimed in claim 10, wherein said digital control information comprises a deviation from desired voltage level and said method comprises the further step of, in a converter station receiving said control information, adjusting the set-point DC voltage level in order to meet the deviation of the converter station transmitting said control information.

12. The method as claimed in claim 11, wherein a duration of said modulated signal gives information about the urgency to adjust said set-point DC voltage level, and/or an actual or desired magnitude of a voltage level.

13. The method as claimed in claim 10, wherein information communicated comprises one or more of: deviation from desired DC or AC voltage level, frequency of a respective ac-network, a signals common to all of said converter stations such as pilot node voltage, load level within said DC power transmission network or load level within the respective converter stations.

14. The method as claimed in claim 1, comprising the further step of:
measuring in at least one point of said DC power transmission system a current change as a result of said step of changing a set-point DC voltage level.

15. The method as claimed in claim 14, comprising measuring in two points, said two points comprising a respective end of a transmission line of said DC power transmission system.

16. The method as claimed in claim 15, comprising the further step of:
correlating said measured current change to a converter station having most influence on said current change.

17. The method as claimed in claim 1, wherein information communicated comprises one or more of: deviation from desired DC or AC voltage level, frequency of a respective ac-network, a signals common to all of said converter stations such as pilot node voltage, load level within said DC power transmission network or load level within the respective converter stations.

18. A controller unit for a converter station controlling power flow in a DC power transmission network, said controller unit being configured to carry out the method as claimed in claim 1.

19. A non-transitory computer readable medium for communication within a DC power transmission system comprising two or more interconnected converter stations where the time domain is divided into several recurring time slots of fixed length, one for each converter station, said non-transitory computer readable medium comprising a computer program product which carrying computer programs code, said program code being configured to:
handle a received synchronization signal for synchronizing said two or more converter stations,
obtain an allocation of a designated communication time slot,
change a set-point DC voltage level during said designated communication time slot,
measure a change of DC current, as a result of a changed set-point DC voltage level, in timeslots other than said designated communication time slot, and
correlating said measured current change to said converter station having most influence on said current change,
where the changing of a set point and measuring the change of DC current are performed for conveying information between the converter stations without the use of an external communication system.

* * * * *